July 2, 1946.  E. L. RIETZ  2,403,401
SIDE DELIVERY RAKE
Filed Dec. 27, 1943  2 Sheets-Sheet 1
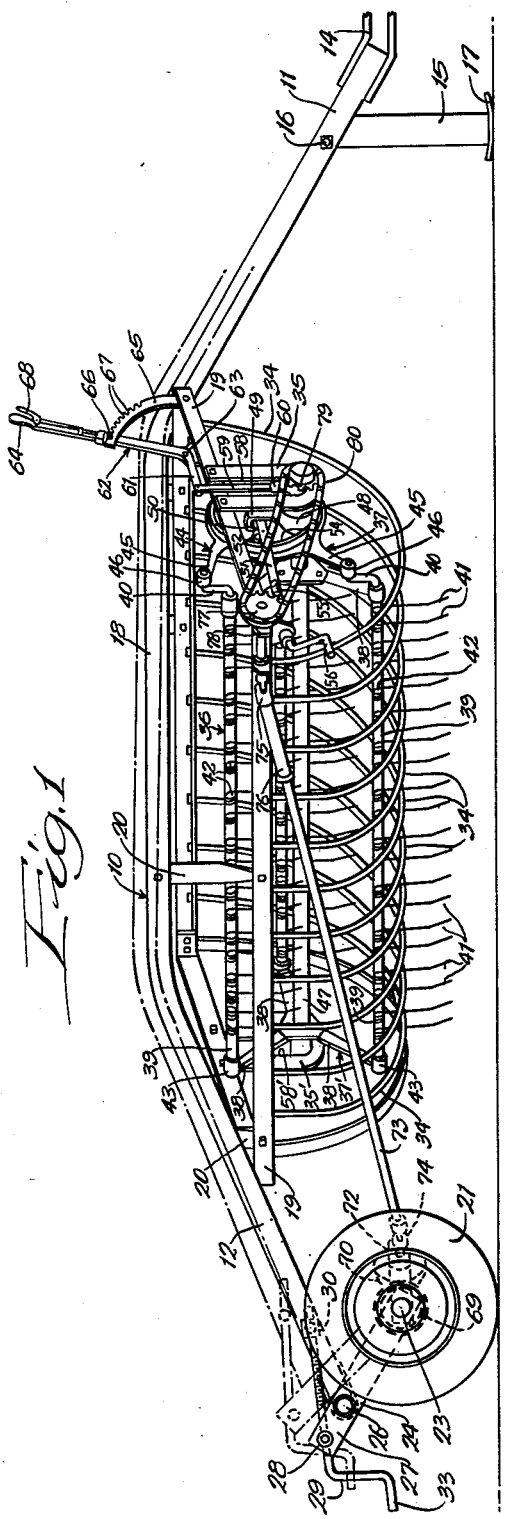
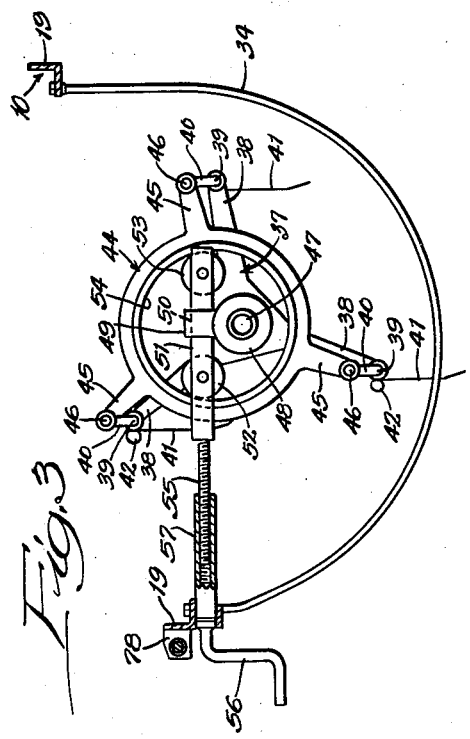
Inventor:
Edward L. Rietz,
By Paul O. Pippel
Attorney.

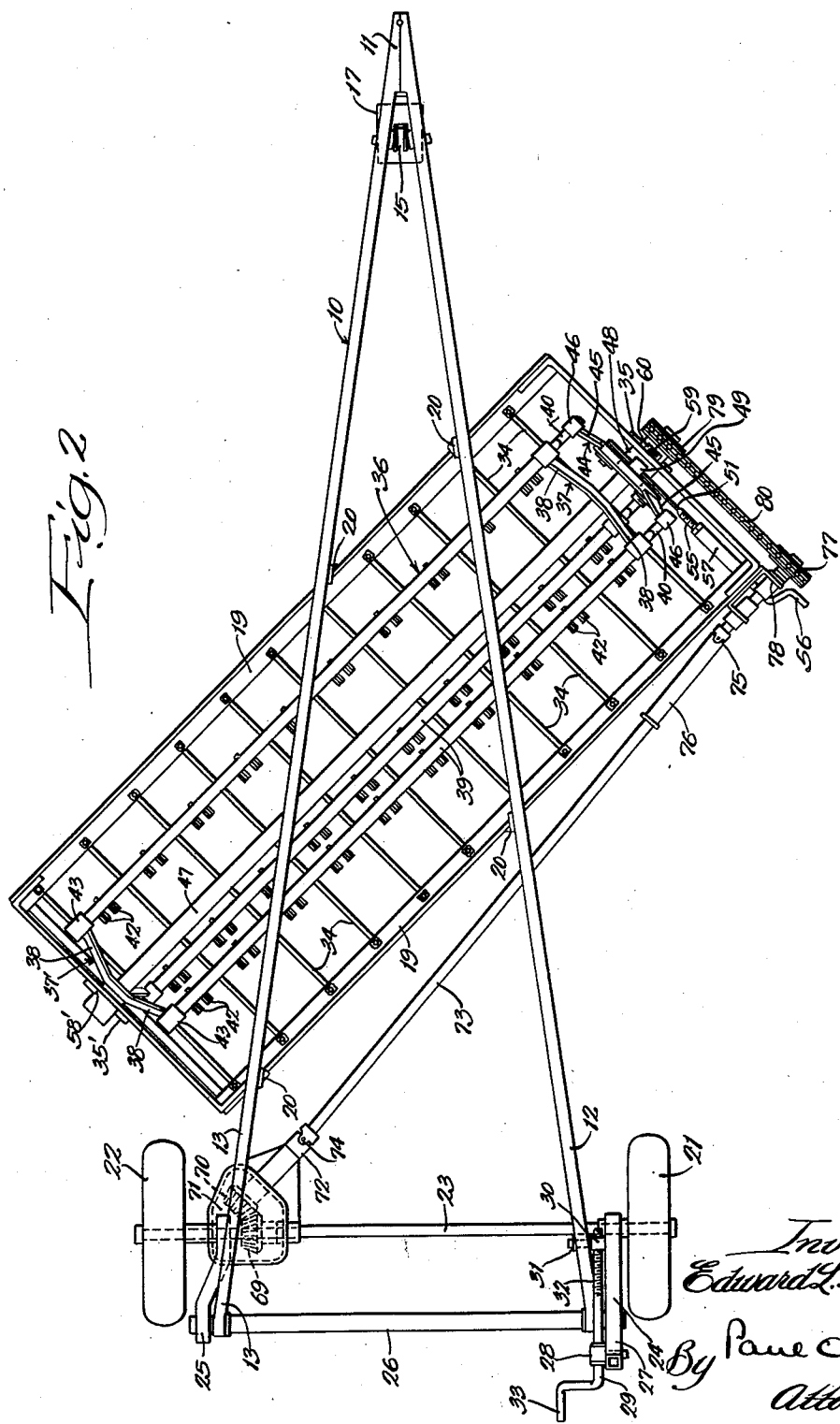

Patented July 2, 1946

2,403,401

UNITED STATES PATENT OFFICE 2,403,401

SIDE DELIVERY RAKE

Edward L. Rietz, Riverside, Ill., assignor to International Harvester Company, a corporation of New Jersey Application December 27, 1943, Serial No. 515,643

3 Claims. (Cl. 56—377)

1

This invention relates to a new and improved side delivery rake and has for one of its principal objects the provision of a longitudinally arched frame carried at one end by a draft vehicle and supported by a two-wheel truck at the rear thereof.

An important object of this invention is to provide an adjustably tiltable wheel truck for varying the height of a side delivery rake.

Another important object of this invention is the provision of a novel ground wheel drive for a side delivery rake.

Another and further important object of this invention is the provision of a tractor-drawn side delivery rake incorporating an arched frame and having a raking cylinder suspended from the high point of the arched frame.

A still further important object of this invention is to provide a V-shaped arched frame for a side delivery rake.

Other and further important objects will become apparent from the following detailed description and accompanying sheets of drawings, in which:

Figure 1 is a side elevational view of the side delivery rake of this invention;

Figure 2 is a top plan view of the rake of this invention; and

Figure 3 is a sectional detail of the rake teeth adjusting means.

Referring to the drawings, the reference numeral 10 indicates generally a longitudinally disposed, V-shaped arched frame which has an apex 11 at its front and wide spread arms 12 and 13 at its rear end. The apex 11 of the frame 10 supports a clevis 14 for the purpose of hitching to a draft vehicle such as a tractor or the like. As best shown in Figure 1, the forward end of the frame near the apex 11 is equipped with a leg member 15 which is hinged at 16, whereby when the rake is supported by a tractor drawbar, the leg 15 is swung upwardly between the frame arms 12 and 13. The leg 15 has a ground-engaging foot 17, and when the rake is not in use, it supports the forward end thereof.

The central part of the frame is raised in an arch 18 beneath which is suspended a side delivery rake cylinder frame 19 by means of straps 20. The rear end of the rake frame 10 is supported by transversely alined wheels 21 and 22, which are mounted adjacent the frame arms 12 and 13, respectively. The wheels 21 and 22 are mounted on a single transverse axle 23, and with the addition of rearwardly and upwardly extending arms 24 and 25 form a sturdy wheel truck.

2

The upper ends of the arms 24 and 25 are affixed to a transverse shaft or bolster 26, which is journaled in the ends of the arms 12 and 13 and is disposed parallel with but to the rear, and above axle 23. The wheel truck is, therefore, hinged for arcuate movement about this shaft 26 and beneath the frame 10. It is evident that swinging this wheel truck in an arc beneath the bolster 26 will cause the frame 10 to be raised and lowered, depending upon the angular position of the arms 24 and 25. An upward extension 27 of the arm 24 is utilized to swing the wheel truck about this shaft 26. A bracket 28 is fixedly attached to the upward extension 27 by means of welding or the like, and acts as a bearing support for a crank arm 29. Another bracket 30 is clamped to the frame arm 12 at 31 and is equipped with an internally threaded aperture which is engaged by a threaded portion 32 of the crank arm 29. A crank handle 33 projects rearwardly of the frame 10 and is adapted to rotate the crank arm 29. It is quite evident that as the crank arm 29 is rotated, the wheel truck is inclined a greater or lesser degree depending on the engagement of the threaded portion 32 of the crank with the bracket 30. The dashed line position of Figure 1 shows the frame raised by the raising of the wheel truck bolster 26.

The cylinder frame 19 is equipped with substantially semi-circular stripper bars 34, which are positioned at regular intervals along the length thereof. U-shaped brackets 35 and 35' depend from each end of the cylinder frame 19, as best shown in Figure 1, and are adapted to journally support a raking cylinder 36. This cylinder has a pair of spiders 37 and 37' at each end thereof. Each spider is equipped with three equally spaced radially extending arms 38 which journally support longitudinal rods 39. Each of these rods 39 has a bent end portion 40, as shown in Figures 1 and 3 at the end of the raking cylinder having the spider 37. The rods 39 support a plurality of rake teeth 41. The teeth 41 have coil springs 42 intermediate their ends and their attachment to the rods 39, whereupon they are made resiliently yieldable. The rods 39 terminate in bearings 43 in the spider 37'.

It will be understood that rotation of the rods 39 will effect a change in the angular inclination of the rake teeth 41. As shown in Figure 3, an eccentric adjustment means is provided to permit rotation of these rods 39 and to lock them in any desired position. A circular frame 44, as shown in Figure 3, has three radial fingers 45 which are adapted to receive the bent ends 40 of the rods 39 at 46. The raking cylinder 36 has a central shaft 47 on which is mounted the spiders 37 and 37'. A bearing hub 48 surrounds this shaft 47 and has mounted thereon an upwardly extending guide bracket 49. The guide bracket 49 has a central aperture 50, as shown in Figure 1, through which passes an arm 51 journally supporting wheels 52 and 53. These wheels 52 and 53 are mounted on the side of the arm 51 and are adapted to contact the inner circumference 54 of the circular frame 44. A threaded stud 55 is coextensive and integral with the arm 51 and is shiftable transversely of the cylinder frame by means of a crank 56, which includes an internally threaded sleeve portion 57 which engages the threaded stud 55. The crank 56 is affixed to the cylinder frame 19. As the roller wheels 52 and 53 are moved transversely by means of the crank-adjusting means, it is evident that the circular frame 44 will move by reason of the rollers contacting the inner bracket 54 of this circular frame 44. As shown in Figure 3, the central shaft 47 of the raking cylinder 36 is substantially located in the middle of the circular frame 44, whereby the ends 40 of the rods 39 are substantially vertical, and thereupon the rake teeth 41 are also vertically disposed. However, a movement of this circular frame 44 to either the right or left will cause the ends 40 of the rods 39 to be inclined, whereupon the rake teeth 41 will also be inclined a corresponding amount. In other words, the circular frame 44 is shifted with respect to the central shaft 47 of the raking cylinder 36 and so forms a variable eccentric.

The ends of the shaft 47 are journally supported within the U-shaped brackets 35 and 35'. An adjusting means is provided to cause a raising or lowering of at least one end of the shaft 47 within one of the slots 58 in the U-shaped brackets 35. A connecting link 59 is adapted to be attached to a bearing 60 which is slidable within the vertical slot 58. The other end of the connecting link 59 is attached to one end 61 of bell-crank lever 62. The bell-crank lever 62 is pivoted at 63 on the cylinder frame 19 and is operable by an upwardly extending handle 64. When the handle 64 is pulled downwardly around the arcuate quadrant 65, it is obvious that the connecting link 59 will lift the bearing 60 and hence the entire end of the raking cylinder 36. A pawl and detent are provided on the handle 64 and quadrant 65, respectively, to effect a positive locking of the bearing 60 at any desired height within the slot 58 of the U-shaped bracket 35. The pawl is shown at 66 as a part of the handle 64, and the detent teeth 67 are in the outer surface of the arcuate quadrant 65. A small bell-crank lever 68 is provided adjacent the handle 64 for raising and lowering the pawl 66 to and from engagement with the teeth 67.

The other end of the raking cylinder is allowed to float within the slot 58' of the U-shaped bracket 35'. It will be realized that should the rake teeth 41 strike some obstruction in addition to the teeth being yieldable because of the springs 42, the raking cylinder will rise within the slot 58'.

As best shown in Figure 2, a bevel gear 69 is keyed or otherwise affixed to the transverse wheel axle 23 and is adapted to engage a bevel gear 70. These bevel gears 69 and 70 are enclosed within a gear housing 71 which is suspended beneath the frame arm 13. A shaft 72 projects diagonally forward from the bevel gear 70 and is adapted to drive a similarly directed shaft 73 through a universal joint 74. The shaft 73 runs substantially parallel with the raking cylinder 36 and terminates adjacent the forwardly extending end of the cylinder frame 19. The cylinder frame 19 is hung diagonally between the frame arms 12 and 13. A second universal joint 75 is adapted to be driven by the shaft 73 through a telescoping sleeve 76. The drive proceeds from this joint 75 to a sprocket 77, which is journaled on a bracket 78 affixed to the cylinder frame 19. Another sprocket 79 is keyed to the shaft 47 and is driven by the sprocket 77 by means of a chain 80. It is obvious that rotation of the central shaft 47 will cause simultaneous rotation of the raking cylinder 36.

The upper arched portion of the frame at 18 supports the cylinder frame 19 and is quite advantageous in employing low standard size wheels, as shown at 21. Present day farm machinery employs pneumatic tires on nearly all of its implements, and it is desirable for the side delivery rake to also have these standard size low pneumatic tire wheels. Hence, it is desirable to employ this arched V-shaped frame. The V-shape is especially adapted for receiving a two-wheel truck at the wide rear end thereof, and the forward apex end is also especially adapted to attach to a draft vehicle.

It is evident that herein is provided a side delivery rake which will pick up hay, straw, or other grain and lay it in a windrow without interference from forwardly positioned wheels on the implement. The height of the raking cylinder may be varied by means of the crank 33, or it may be raised at one end by the lever 64. In spite of the variations in cylinder height, the ground wheel drive maintains constant connection with the raking cylinder. This is made possible by means of the telescoping drive members 73 and 76 so that the length of the drive may be varied according to the inclination of the wheel truck.

Heretofore, side delivery rakes customarily employed a pair of forward wheels and possibly one or even two caster wheels. Such a device was cumbersome and complex in its construction. The present side delivery rake utilizes a substantially symmetrical construction and is simple and easy to operate.

The intention is to limit the invention only within the scope of the appended claims.

What is claimed is:

1. A side delivery rake comprising a supporting frame adapted to be held at its forward end by a draft vehicle and at its rear end by a two wheel truck including an axle and a pair of spaced wheels attached to said axle, a cylinder frame suspended from said supporting frame and positioned at an angle from the right front to the left rear, a raking cylinder rotatably journaled in said cylinder frame, means for driving the raking cylinder at its right front end from said axle at a position adjacent the left rear wheel, said means for driving the raking cylinder comprising a drive arm extending substantially parallel with the angularly positioned cylinder frame and associated with the wheel truck axle and raking cylinder.

2. A side delivery rake comprising a supporting frame adapted to be held at its forward end by a draft vehicle and at its rear end by a two wheel truck, a cylinder frame suspended from said supporting frame and positioned at an angle from the right front to the left rear, a raking cylinder rotatably journaled in said cylinder frame, means for driving the raking cylinder at its right front end from a position adjacent the left rear wheel, said means for driving the raking cylinder comprising a drive arm extending substantially parallel with the angularly positioned cylinder frame, a pair of bevelled gears associated with the wheel truck imparting rotation to said drive arm and a pair of sprockets and a chain at the forward end of said drive arm associated with said raking cylinder and imparting rotation to said raking cylinder.

3. A side delivery rake having an arched two arm V-shaped frame adapted to be supported at its apex forward end on a draft vehicle and at its spread rearward end on a two wheel truck, a cylinder frame diagonally suspended from an intermediate portion of said arched frame, means for adjustably inclining said two wheel truck forwardly beneath said frame, a raking cylinder rotatably journaled in said cylinder frame, a telescoping drive arm substantially paralleling the diagonal cylinder frame and extending from a rear truck wheel adjacent the rear end of the cylinder frame and forward to a point adjacent the forward end of the cylinder frame, and means for imparting rotation from said wheel truck to said drive arm and from said drive arm to said raking cylinder.

EDWARD L. RIETZ.